(12) United States Patent
Wu et al.

(10) Patent No.: US 8,099,587 B2
(45) Date of Patent: Jan. 17, 2012

(54) COMPRESSING AND ACCESSING A MICROCODE ROM

(75) Inventors: Youfeng Wu, Palo Alto, CA (US); Sangwook Kim, Austin, TX (US); Mauricio Breternitz, Jr., Austin, TX (US); Herbert Hum, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1352 days.

(21) Appl. No.: 11/186,240

(22) Filed: Jul. 20, 2005

(65) Prior Publication Data

US 2007/0022279 A1    Jan. 25, 2007

(51) Int. Cl.
*G06F 9/00* (2006.01)

(52) U.S. Cl. ...................................... 712/245
(58) Field of Classification Search .................... 712/245
See application file for complete search history.

(56) References Cited

U.S. PATENT DOCUMENTS 5,764,994 A    6/1998    Craft
6,199,126 B1 *    3/2001    Auerbach et al. ............... 710/68

OTHER PUBLICATIONS

Wolfe and Chanin—Executing Compressed Programs on an Embedded RISC Architecture—the article was published on Micro 25, Proceedings of the 25th Annual International Symposium on Microarchitecture, 1992.

* cited by examiner

*Primary Examiner* — Alford W. Kindred
*Assistant Examiner* — Benjamin Geib
(74) *Attorney, Agent, or Firm* — Blakely, Sokoloff, Taylor & Zafman LLP

(57) ABSTRACT

An arrangement is provided for compressing microcode ROM ("uROM") in a processor and for efficiently accessing a compressed "uROM". A clustering-based approach may be used to effectively compress a uROM. The approach groups similar columns of microcode into different clusters and identifies unique patterns within each cluster. Only unique patterns identified in each cluster are stored in a pattern storage. Indices, which help map an address of a microcode word ("uOP") to be fetched from a uROM to unique patterns required for the uOP, may be stored in an index storage. Typically it takes a longer time to fetch a uOP from a compressed uROM than from an uncompressed uROM. The compressed uROM may be so designed that the process of fetching a uOP (or uOPs) from a compressed uROM may be fully-pipelined to reduce the access latency.

31 Claims, 18 Drawing Sheets

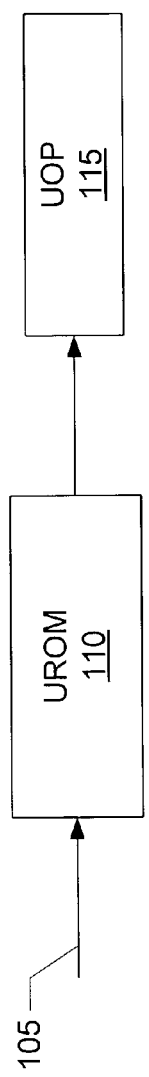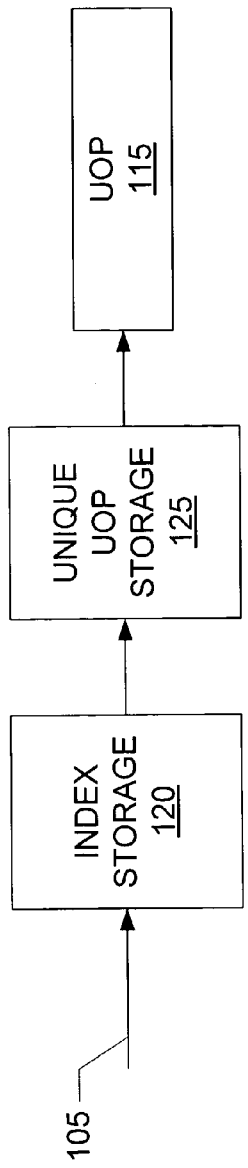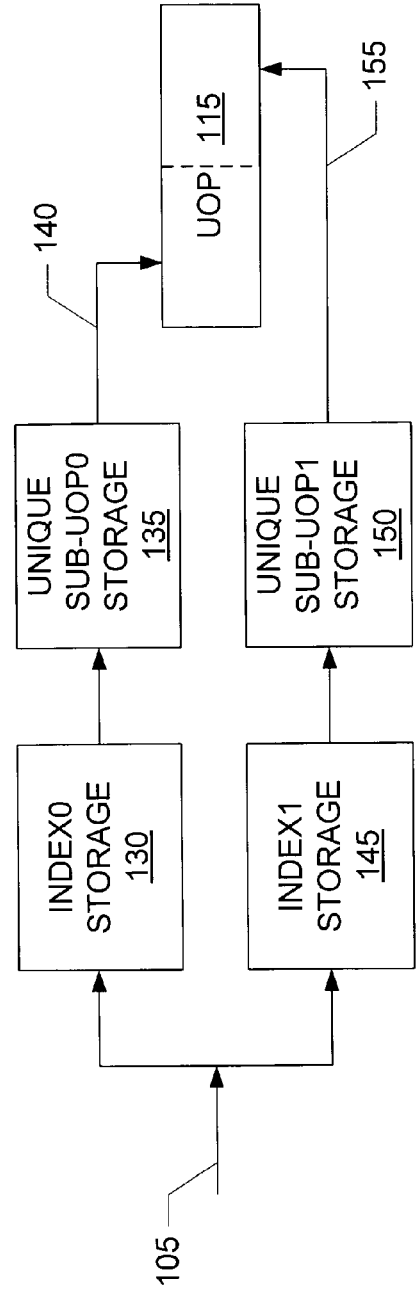

FIGURE 2

| UOP INDEX (210) |
|---|
| 1 |
| 2 |
| 3 |
| 4 |
| 5 |
| 6 |
| 7 |
| 8 |
| 9 |
| 10 |

220

| COLUMN INDEX | | | | | | |
|---|---|---|---|---|---|---|
| 1 | 2 | 3 | 4 | 5 | 6 |
| 1 | 0 | 1 | 0 | 1 | 0 |
| 0 | 1 | 0 | 1 | 0 | 1 |
| 1 | 0 | 1 | 0 | 1 | 0 |
| 0 | 0 | 0 | 0 | 0 | 0 |
| 0 | 1 | 0 | 1 | 0 | 1 |
| 1 | 0 | 1 | 0 | 1 | 0 |
| 0 | 0 | 0 | 0 | 0 | 0 |
| 0 | 1 | 0 | 1 | 0 | 1 |
| 1 | 0 | 1 | 0 | 1 | 0 |
| 0 | 1 | 0 | 1 | 0 | 1 |

230

| COLUMN INDEX | | | | | | |
|---|---|---|---|---|---|---|
| 1 | 3 | 5 | 2 | 4 | 6 |
| 1 | 1 | 1 | 0 | 0 | 0 |
| 0 | 0 | 0 | 1 | 1 | 1 |
| 1 | 1 | 1 | 0 | 0 | 0 |
| 0 | 0 | 0 | 0 | 0 | 0 |
| 0 | 0 | 0 | 1 | 1 | 1 |
| 1 | 1 | 1 | 0 | 0 | 0 |
| 0 | 0 | 0 | 0 | 0 | 0 |
| 0 | 0 | 0 | 1 | 1 | 1 |
| 1 | 1 | 1 | 0 | 0 | 0 |
| 0 | 0 | 0 | 1 | 1 | 1 |

/* Assume the microcode has N rows and L columns */

505: Identify the best clustering of the microcode into K clusters $C_1, C_2, ..., C_K$ of the L columns 510: For each cluster $C_i$ which has $L_i$ columns 515:   Identify the $M_i$ unique raw patterns in $C_i$;

520:   Create an Index Table i ($IT_i$) with N rows and $\log_2(M_i)$ columns;

525:   Create a Pattern Table i ($PT_i$) with $M_i$ rows and $L_i$ columns, and assign unique patterns in $PT_i$;

530:   Assign each row in $IT_i$ with the index value of the corresponding pattern in $PT_i$;

535: end

540: Build the compressed UROM with Index Tables, Pattern Tables, and spreaders.

FIGURE 5

610: For K = 1 to X
620:    Equally divide the L columns into K clusters;
630:    Repeat
640:        Shuffle columns around to improve the objective function;
650:    Until heuristic_termination_condition met;
660: end
670: Select the K which results in the best clustering.

FIGURE 6

705: For K = 1 to X

710: Equally divide the L columns into K clusters;

715: Repeat

720:     For I = 1 to K-1 DO

725:         For J=1 to I-1

730:            If (I == J) Continue;

735:            For u = 1 to $L_i$

740:                For v = 1 to $L_j$

745:                    If objective function improves when switching columns u in $C_i$ and v in $C_j$, modify $C_i$ and $C_j$ with the switch;

750: Until all clusters have been tried;

755: end

760: Select the K which results in the best clustering.

FIGURE 7

810: Divide the L columns into W clusters such that each is an operand/opcode in the microcode word;

820: Compute the objective function for W clusters;

830: Best clustering = current clustering;

840: For each of permutations of the W clusters

850:   Divide the permutation roughly into half at field boundary;

860:   Evaluate the objective function for 2 clusters

870:   If the objective function is better than the previous one, Best_Clustering = current clustering 880: end 890: Return Best_Clustering

FIGURE 8

910: For K = 1 to X

920:     Equally divide the L columns into K clusters

930:     Repeat

940:         Compute the center for each of K clusters;

950:         For each column, find the center that is closest to it and assign it to that cluster (if not already in the cluster);

960:     Until no column moves to a different cluster;

970: end

970: Select the K which results in the best clustering

FIGURE 9

| | |
|---|---|
| 1010: | For K=1 to X |
| 1020: | Build affinity graph with each column being a node and the edge between nodes A and B being the distance between them; |
| 1030: | Partition the graph into K subgraphs such that the total distance are minimized; |
| 1040: | Use K subgraphs as K clusters for the clustering-based compression; |
| 1050: | Compute the objective function value for this clustering; |
| 1060: | end |
| 1070: | Select the K which results in the best objective function value. |

FIGURE 10

1110: Receive the entire microcode;

1120: For I = 1 to J /* for each clustering scheme */

1130: Obtain a best clustering result using clustering scheme I;

1140: Computer bit reduction rate for this best clustering result, $R_i$;

1150: If I = 1, keep the current clustering result and continue;

1160: If $R_i > R_{i-1}$, keep the current clustering result; otherwise, disregard the current clustering result;

1170: end

1180: Use the resulting clusters for microcode compression.

COMPRESSING AND ACCESSING A MICROCODE ROM

BACKGROUND

1. Field

This disclosure relates generally to processor designs and, more specifically, to compressing microcode ROM and to accessing compressed microcode ROM in a processor.

2. Description

Modern microprocessors typically use microcode (stored in microcode ROM ("uROM")) to emulate legacy instructions, to emulate infrequently executed new functionalities, and to apply functionality patches to an existing design. Using microcode to perform such functions is usually less expensive in terms of die area, power consumption and design cost than using hardware logic. Some processors, especially those new versions what must be compatible with their corresponding predecessors, however, have to support many infrequently executed legacy instructions as well as new functions. As a result, the uROM itself can become fairly big and occupy a significant portion of the total processor core area. For example, the die area of the uROM may approach 20% of the entire die area of those small processing cores targeting the embedded market. In addition, power leakage can also occupy a significant portion of the total power consumption by a processing core. The larger the uROM die area is, the more costly a processor is and the more power leakage the uROM may cause to the processor. Thus, it is desirable to reduce the size of a uROM in a processor.

BRIEF DESCRIPTION OF THE DRAWINGS

The features and advantages of the disclosed subject matter will become apparent from the following detailed description of the subject matter in which:

FIGS. 1A, 1B, and 1C illustrate examples of uROM compression;

FIG. 2 illustrates an example for compressing a uROM using a clustering approach;

FIG. 5 shows one example pseudo code for compressing a uROM using a clustering-based approach;

FIG. 6 shows one example general pseudo code for clustering uOPs using heuristic-based approaches;

FIG. 7 shows one example pseudo code of a column-wise improvement heuristic based clustering approach;

FIG. 8 shows one example pseudo code of a clustering approach using an operand combining based heuristic scheme;

FIG. 9 shows one example pseudo code of a clustering approach using a k-mean based heuristic scheme;

FIG. 10 shows one example pseudo code of a clustering approach using a graph partition based heuristic scheme;

FIG. 11 shows one example pseudo code for performing a compression process to a uROM using different clustering-based approaches;

DETAILED DESCRIPTION

Figure 3:
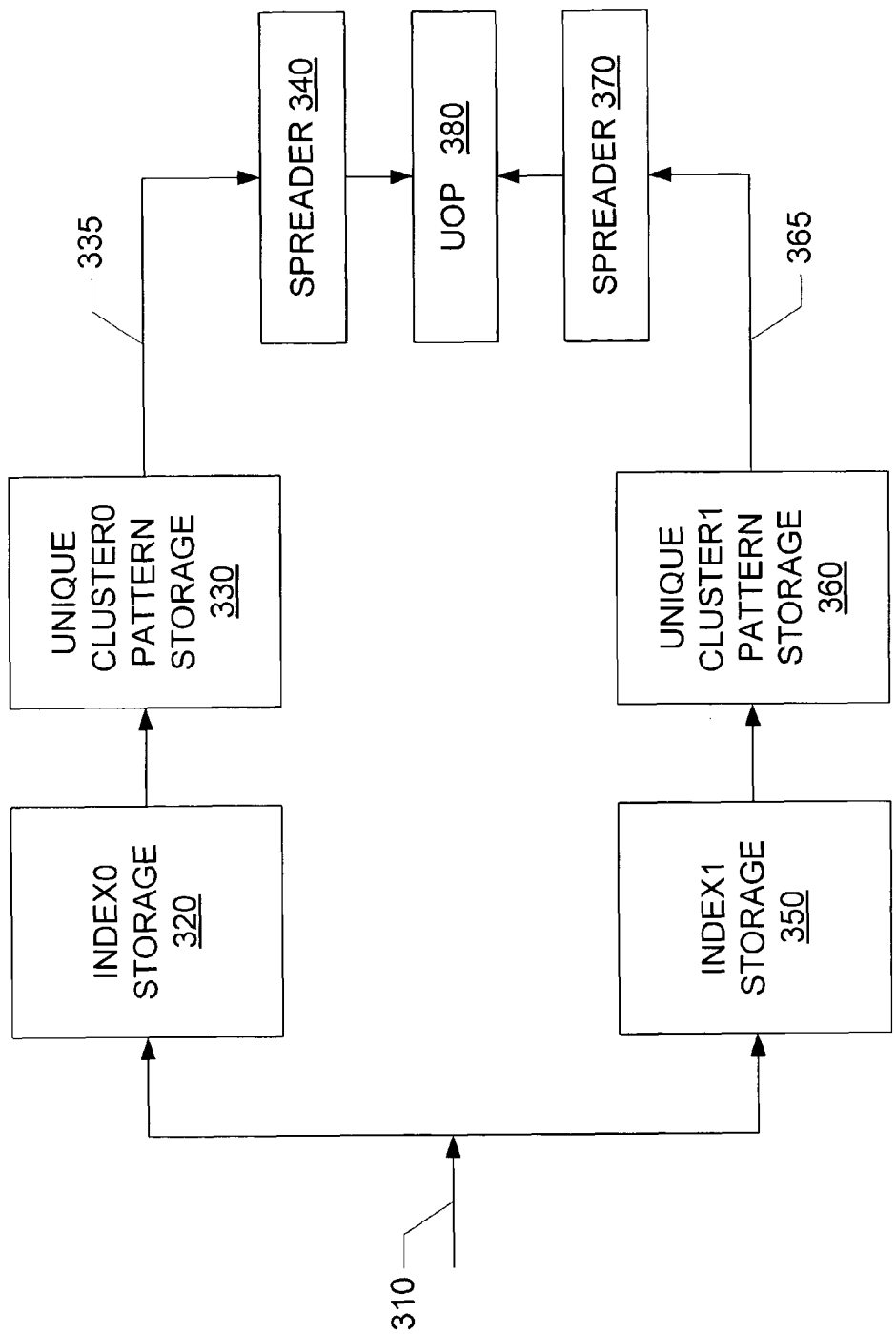
FIG. 3 illustrates an example for accessing a uOP in a uROM compressed using a clustering-based approach.

A compressed uROM helps reduce the die size and power leakage of a processor. According to an embodiment of techniques disclosed in this application, uROM may be compressed using a clustering-based approach. The clustering-based compression selectively clusters similar columns of a microcode word ("uOP") table containing all uOPs of a processor into groups. Each group is subsequently analyzed to identify unique patterns within the group. A pattern table may be created to store the identified unique patterns. An index table may also be created to store indices of entries in the pattern table. A mapping may be generated between the index table and the pattern table. A uROM may then be built with such pattern tables and their corresponding index tables. Compared to an uncompressed uROM, the resulting uROM may be significantly compressed and occupy a smaller portion of the processor's die area.

However, accessing a compressed uROM and receiving a uOP therefrom may need one additional cycle compared to receiving a uOP from an uncompressed uROM. According to an embodiment of techniques disclosed in this application, the process of retrieving a uOP from a compressed uROM may be pipelined so that the average number of cycles needed to retrieve a uOP in the compressed uROM is approximately the same as that needed to retrieve a uOP in a uncompressed uROM. An address distributor, an index storage device, an index buffer, a unique sub-uOP storage device, and an output uOP assembler may be used for pipelining the accessing process of a uROM. Additionally, a uROM may be partially compressed and partly uncompressed so that the number of cycles needed to retrieve a uOP is the same as that needed to retrieve a uOP in an uncompressed uROM.

Reference in the specification to "one embodiment" or "an embodiment" of the disclosed subject matter means that a particular feature, structure or characteristic described in connection with the embodiment is included in at least one embodiment of the disclosed subject matter. Thus, the appearances of the phrase "in one embodiment" appearing in various places throughout the specification are not necessarily all referring to the same embodiment.

FIGS. 1A shows how a uOP 115 is fetched in an uncompressed uROM 110. The address (105) of the uOP directly accesses the uROM 110 to fetch the uOP. FIG. 1B shows how a uOP 115 is fetched in a compressed uROM. The compressed uROM comprises an index storage 120 and a unique uOP storage 125. The basic idea for UROM compression is to identify a set of unique bit patterns that compose all the uOPs and store these unique patterns in unique uOP storage 125, and store the short unique id for each pattern in index storage 120. In FIG. 1B, address 105 of a uOP 115 accesses the index storage. The index of a unique pattern, which the uOP belongs to, is obtained from the index storage. The unique pattern is then fetched from the unique uOP storage based on its index. The unique pattern so fetched is actually uOP 115. Assume the original uROM has N uOPs each with L bits, and there are a total of M unique uOPs. The uncompressed UROM as shown in FIG. 1A takes N*L bits and the compressed UROM as shown in FIG. 1B takes only N*log$_2$(M)+M*L bits. For example, if N=20000, M=12000, and L=70, the compressed uROM uses 1140000 bits while the uncompressed uROM uses 1400000 bits. The compressed uROM results in about 19% reduction in bits.

FIG. 1C shows another way in which a uROM may be compressed and how a uOP may be fetched therefrom. According to this compression approach, each uOP may be split into a number of sub-uOPs such that the number of unique patterns for all the uOPs is minimized. FIG. 1C shows an example where each uOP is split into two roughly same-sized sub-uOPs: sub-uOP0 and sub-uOP1. All of the sub-uOP0s are put together in one set and all of the sub-uOP1s are put together in the other set. Unique patterns may be identified from each set of sub-uOPs. Unique patterns for sub-uOP0s may be stored in unique sub-uOP0 storage 135 and unique patterns for sub-uOP1s may be stored in unique sub-uOP1 storage 150. Index0 storage 130 stores indices of unique patterns in unique sub-uOP0 storage 135, and index1 storage 145 stores indices of unique patterns in unique sub-uOP1 storage 150. Address 105 of a uOP 115 accesses index storages 130 and 145 to obtain indices of two unique patterns, which form the uOP, in unique sub-uOP0 storage 135 and unique sub-uOP1 storage 150. Two unique sub-uOPs may then be fetched from their corresponding storage (135 and 150) based on their indices to form uOP 115.

Assume that original uROM has N uOPs each with L bits. Further assume M1 and M2 are the number of unique sub-uOP0 patterns and the number of unique sub-uOP1 patterns, respectively. The uncompressed uROM as shown in FIG. 1A takes N*L bits to store all the uOPs and the compressed UROM as shown in FIG. 1C takes only N*(log$_2$(M1)+log$_2$(M2))+M1*L/2+M2*L/2 bits. For example, if N=20000, M1=5000, M2=5000, and L=70, the compressed UROM uses 870000 bits while the original UROM uses 1400000 bits. The compressed uROM as shown in FIG. 1C results in about 38% reduction in bits, compared to 19% reduction in bits brought by compressed uROM as shown in FIG. 1B.

One observation from the above compression schemes as shown in FIGS. 1B and 1C is that with a proper partitioning of uOPs into sets of sub-uOPs, the number of total unique patterns across different sets of sub-uOPs may further decrease and thus the total size of a uROM may also further decrease. FIG. 2 illustrates an example for compressing a uROM using a clustering-based approach. When the design of a processor is completed, its microcode is usually also fixed. All of the uOPs in the microcode may be put in a table with each row containing one uOP. Without any compression, the table would correspond to a uROM. The clustering-based compression approach selectively clusters similar columns into groups, and goes beyond the simple partitioning of uOPs into sub-uOPs. For example, table 220 contains 10 uOPs with an index column 210. Each uOP in the table may be partitioned into two sub-uOPs: the first half sub-uOP containing bits in columns 1-3 and the second half sub-uOP containing bits in columns 4-6. With this partitioning, a group of all of the first half sub-uOPs and a group of all of the second half sub-uOPs, each has three different unique patterns and each requires two bits to index its unique patterns. Using the compression approach as shown in FIG. 1C, the compressed uROM would need 10*(2+2)+3*3+3*3=48 bits, which is approximately a 20% reduction from the original uncompressed size of 60 bits.

The clustering-based compression approach selects columns that are similar to each other into groups. For example, uOPs in table 220 may be clustered into the two groups as shown in table 230, where columns 1, 3, and 5 are clustered into the first group and columns 2, 4, and 6 are clustered into the second group. With this new clustering, each group has only two unique patterns and need only 1 bit to index its unique patterns. As a result, the compressed uROM would require only 10*(1+1)+2*3+2*3=32 bits, which is almost a 50% reduction from the original uncompressed size of 60 bits—a significant further reduction compared to that which resulted from the simple sub-uOP-based partitioning approach.

FIG. 3 illustrates an example for accessing a uOP in a uROM compressed using a clustering-based approach. In this example, columns of all uOPs are clustered into two clusters: cluster0 and cluster1. Unique cluster0 pattern storage 330 stores unique patterns for cluster0 and unique cluster1 pattern storage 360 stores unique patterns for cluster1. Index0 storage 320 and index1 storage 350 store indices of unique patterns in unique cluster0 storage 330 and unique cluster1 pattern storage 360, respectively. Address 310 of a uOP 380 accesses index storages 320 and 350 to obtain indices of two unique patterns, which form the uOP, in unique pattern storages 330 and 360, respectively. Compared to FIG. 1C, there are two new components for accessing a uOP in uROM compressed using a clustering-based approach: spreader 340 and spreader 370 for cluster0 and cluster1, respectively. Each spreader spreads the unique patterns in a cluster into the appropriate bits in the final uOP. These spreaders are simply a rewiring of the original path that connect the outputs of unique pattern storages 330 and 360 to final uOP 380, and should not cost any additional die area or power. Although only two clusters are shown in FIG. 3, this method for accessing a uROM compressed using a clustering-based approach can be easily extended to situations where more than two clusters exist.

Figure 4:
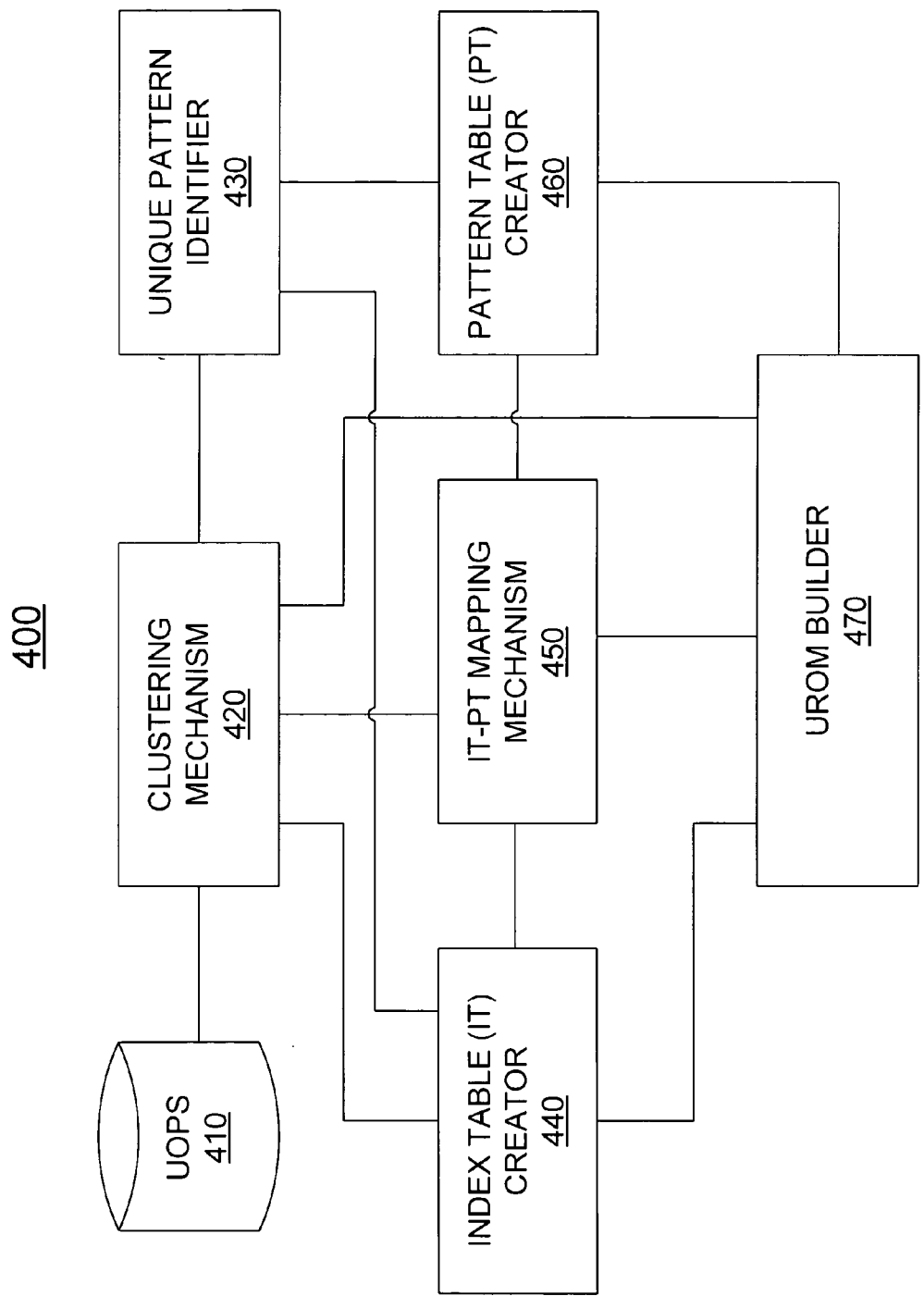
FIG. 4 shows one example block diagram of an apparatus for compressing a uROM using a clustering-based approach.

FIG. 4 shows one example block diagram of an apparatus 400 for compressing a uROM using a clustering-based approach. Apparatus 400 comprises several functional components: a clustering mechanism 420, a unique pattern identifier 430, a index table (IT) creator 440, a pattern table (PT) creator 460, a IT-PT mapping mechanism 450, and a uROM builder 470. Once a processor is designed, its uOPs can be identified and put into a table (e.g., uOPs 410) for column-based clustering. Clustering mechanism 420 receives the uOPs table and clusters columns of the table into one or more clusters. A criterion used by the clustering mechanism for clustering columns may be to minimize an objective function (OF). There may be multiple ways to define the OF, one of which may be as follows, $$OF = \sum_{i=1}^{K} [N(\log_2 M_i) + M_i * L_i], \qquad (1)$$

where N is the number of bits in each column of the uOP table; K is the number of clusters that the L columns are clustered into (L is the number of columns in the uOP table); $L_1$, $L_2$, ..., $L_k$ are the numbers of columns in clusters 1, 2, ..., and K, respectively; $M_1$, $M_2$, ..., $M_k$ are the numbers of unique patterns in clusters 1, 2, ..., and K, respectively. For the example shown in table 230 of FIG. 2, N=10, K=2, $L_1$=$L_2$=3, $M_1$=$M_2$=2; thus, OF=10×log2+2×3+10×log2+2×3=32. The clustering mechanism tries to find K clusters such that the value of OF is minimized. Different schemes may be employed by the clustering mechanism to achieve this goal.

After clustering mechanism 420 groups columns in the uOP table into a number of clusters, unique pattern identifier 430 identifies unique patterns in each cluster. Unique patterns in a cluster may be identified by scanning each row in the cluster to identify those unique rows, which constitute unique patterns in the cluster. Index table (IT) creator 440 may then create an index table for each cluster ($C_i$), which includes N rows and $\log_2(M_i)$ columns (assuming that the cluster has $M_i$ unique patterns and the total number of uOPs is N). This index table helps map any uOP address to a unique pattern in cluster $C_i$. Pattern table (PT) creator 460 may create a pattern table to store unique patterns for each cluster ($C_i$). The pattern table includes $M_i$ rows and $L_i$ columns (assuming that cluster $C_i$ has $L_i$ columns) to store $M_i$ unique patterns in cluster $C_i$. IT-PT mapping mechanism 450 may assign each row in an index table with the index value of a pattern in a pattern table. The pattern corresponds to the sub-uOP whose address points to the row in the index table.

Finally, uROM builder 470 builds a uROM with all of the index tables and their corresponding pattern tables. When building the uROM, the uROM builder also builds spreaders for each pattern table (e.g., wiring output from each pattern table to the right bits in the output uOP) so that an output uOP will have the correct bit order. The uROM thus built is compressed using the clustering-based approach.

FIG. 5 shows one example pseudo code for compressing a uROM using a clustering-based approach. Assume that the entire microcode has N rows and L columns. At line 505, the best clustering of uOP columns into K clusters—$C_1, C_2, \ldots, C_k$—may be identified. Different schemes may be used to group uOP columns into clusters. Under each scheme, a different number of clusters may be achieved by minimizing an objective function such as the one defined in Equation (1). By comparing the bit reduction achieved by each scheme, the best clustering by a certain scheme can be identified. At lines 510 through 535 each cluster obtained at line 505 may be processed. At line 515, the $M_i$ unique patterns may be identified in a cluster $C_i$. At line 520, an index table i ($IT_i$) with N rows and $\log_2(M_i)$ columns may be created. At line 525, a pattern table i ($PT_i$) with $M_i$ rows and $L_i$ columns may be created, and $PT_i$ may be assigned with $M_i$ unique patterns. At line 530, each row in $IT_i$ may be assigned with the index value of a pattern in $PT_i$, where the pattern corresponds to a sub-uOP whose address points to the row in $IT_i$. After all the clusters have been processed, a compressed uROM may be built with all of the index tables, pattern tables, and spreaders necessary to ensure the correct bit order in an output uOP at line 540.

The clustering process is a non-polynomial optimization problem. Heuristic-based schemes may be used to solve such a problem. FIG. 6 shows one example general pseudo code for clustering uOPs using heuristic-based schemes. At lines 610 through 660, the clustering process iterates for K=1, to some number X that is less than the number of columns, L, where K is the number of clusters to be obtained. At line 620, the total L columns may be equally divided into K clusters. The division of columns may be performed according to the column order or randomly, i.e., columns 1, 5, 7, and 10 may be put in the same cluster. At lines 630 to 650, columns may be shuffled around among different clusters to improve the objective function. The shuffling process may be repeated until a heuristic termination condition is met.

The heuristic termination condition may be an objective function threshold. Once the value of the objective function falls under this threshold, the shuffling process may stop. The heuristic termination condition may also be times of non-improvement. If after several repetitions, there is no improvement of the objective function value, the shuffling process may stop. Yet the heuristic termination condition may be the amount of improvement during consecutive repetitions. For example, if during two consecutive repetitions, the amount of objective function improvement falls under a per-determined threshold, the shuffling process may stop. Other heuristic termination conditions may also be possible.

For each K (from 1 to X), a clustering result is obtained and a bit reduction rate from the uncompressed microcode may be calculated. By comparing bit reduction rates across clustering results for all the values of K, the best clustering result that has the largest bit reduction rate may be selected and used to compress the uROM at line 670.

FIG. 7 shows one example pseudo code of a column-wise improvement heuristic based clustering approach. This approach switches columns between any two clusters. If the switch improves the objective function, then the switch is made permanent; otherwise, the switch is undone. This column switching process iterates for each value of K (from 1 to X, where X is smaller than the total number, L, of columns in the uOP table), where K is the number of clusters at lines 705 through 755. At line 710, the total L columns may be equally divided into K clusters. The division of columns may be performed according to the column order or randomly, i.e., columns 1, 5, 7, and 10 may be put in the same cluster. At lines 715 to 750, clusters may be paired together and columns in two clusters may be switched. If the switch results in the improvement of the objective function, the switch may stay; otherwise, the switch may be reversed.

For each K (from 1 to X), a clustering result is obtained and a bit reduction rate from the uncompressed microcode may be calculated. By comparing bit reduction rates across clustering results for all the values of K, the best clustering result that has the largest bit reduction rate may be selected and used to compress the uROM at line 760. The switching process may be performed by exchanging multiple bits at one time instead of single bits to speech up the process. Although this column-wise improvement heuristic based clustering approach, as illustrated in FIG. 7, has a 4-level nested loop, it should run reasonable fast as K and L are usually small (e.g. K<=5, and L<=70).

FIG. 8 shows one example pseudo code of a clustering approach using an operand combining based heuristic scheme. Typically, each uOP includes multiple operands/opcodes, i.e., multiple operands/opcodes concatenated with each other to form a uOP. This scheme takes this characteristic of uOPs and tries to improve the initial clustering by different operands. Rather than clustering all the L columns randomly into K clusters, this scheme divides the L columns into W clusters along operands/opcodes dividing lines at line 810. Typically W is small because the number of operands/opcodes in a uOP is normally limited. At line 820, the value of the objective functions of W clusters is calculated. The best clustering result is initialized with the current W clusters at line 830.

At lines 840 through 880, every permutation of original W clusters is considered. At line 850, a permutation is divided into half roughly in the middle but at an operand dividing line. Two clusters are formed after this division. At line 860, the objective function is evaluated to determine if the two clusters resulting from line 850 improves the value of the objective function over original W clusters. If the value of the objective function does improve, use the current clustering result as the best clustering result at line 870. After all the permutations have been processed, the resulting best clustering is used to compress a uROM. Because the number of initial clusters is relatively small, the total number of permutations initial clusters is limited. Thus, this clustering scheme can achieve a good clustering result relatively fast.

FIG. 9 shows one example pseudo code of a clustering approach using a k-mean based heuristic scheme. This scheme tries to improve the initial clustering, which is obtained randomly, by moving columns around until the distance between columns within each cluster cannot be minimized. This k-means-based clustering process iterates for each value of K (from 1 to X, where X is smaller than the total number, L, of columns in the uOP table), where K is the number of clusters at lines 910 through 970. During each iteration, the following processing is performed. At line 920, the total L columns may be equally divided into K clusters. The division of columns may be performed according to the column order or randomly, i.e., columns 1, 5, 7, and 10 may be put in the same cluster. Subsequently, the center for each of the K clusters is computed at line 940. In one embodiment, the center of a cluster may be obtained by averaging all of the column vectors in the cluster. In another embodiment, the center of a cluster may be the geometrical center of all the column vectors in the cluster. Other methods for computing a cluster center may also be used. At line 950, each column in the uOP table may be assigned to a cluster whose center is the closest to the column. Processing in lines 940 and 950 is repeated until no column in the uOP table can be moved to a different cluster.

For each K (from 1 to X), a clustering result is obtained and a bit reduction rate from the uncompressed microcode may be calculated. By comparing bit reduction rates across clustering results for all the values of K, the best clustering result that has the largest bit reduction rate may be selected and used to compress the uROM at line 970.

The distance from each column to a cluster center is computed in k-means based clustering approach. The following definitions of "distance" may be used, where $C=(c_1, c_2, \ldots, c_n)$ and $D=(d_1, d_2, \ldots, d_n)$ are two distinct column vectors:

$$\text{Hamming distance}(C, D) = \sum_{i=1}^{n} c_i \wedge d_i; \tag{2}$$

$$\text{Manhattan distance}(C, D) = \sqrt{\sum_{i=1}^{n} (c_i - d_i)^2}; \tag{3}$$

Min Hamming distance(C, D)=min(Hamming distance(C, D)), Hamming distance(C, ~D)), where ~D is the complement of D; (4)

Min Manhattan distance(C, D)=min(Manhattan distance(C, D), Manhattan distance(C, ~D)), where ~D is the complement of D. (5)

Other definitions of "distance" may also be used. For the k-means heuristic scheme to identify clusters that minimize the objective function, the number of unique patterns in the cluster needs to be small when the "distance" between the columns in a cluster is small.

FIG. 10 shows one example pseudo code of a clustering approach using a graph partition based heuristic scheme. This graph partition based clustering process iterates for each value of K (from 1 to X, where X is smaller than the total number, L, of columns in the uOP table), where K is the number of clusters at lines 1010 through 1070. During each iteration, the following processing is performed. At line 1020, an affinity graph may be built with each column in the uOP table being a node and the edge between two nodes A and B being the distance between them. The distance may be calculated using one of the definitions shown in Equations (2)-(5), or one other type of definition. At line 1030, the affinity graph built at line 1020 may be partitioned into K sub-graphs such that the distance between nodes within each sub-graph is minimized. The resulting K sub-groups may be used as K clusters for clustering-based compression at line 1040. At line 1050, the value of an objective function such as the one shown in Equation (1) may be computed for this clustering. After X iterations are completed, the clustering result with K clusters that results in the best objective function value may be selected to compress the uROM at line 1070.

FIG. 11 shows one example pseudo code for performing a compression process to a uROM using different clustering-based approaches. At line 1110, the entire microcode is received and may be put in a table so that all of the columns of all of the uOPs may be easily obtained. At lines 1120 through 1170, iterations are performed for each clustering scheme. For clustering scheme I, a best clustering result may be obtained at line 1130. At line 1140, the bit reduction rate, $R_i$, resulting from this best clustering result of clustering scheme I may be computed. At line 1150, if clustering scheme I is the first scheme, keep the current clustering result and skip line 1160. The next clustering scheme is used to obtain another best clustering result starting at line 1120. At line 1160, if the bit reduction rate from the current clustering scheme is larger than the bit reduction rate from the previous clustering scheme, keep the current clustering result; otherwise, disregard the current clustering result. The clustering result that survived iterations from line 1120 to 1170 may be selected and used to compress the uROM at line 1180.

Compared to an uncompressed uROM, an compressed uROM can reduce the die size and power consumption, and decrease power leakage caused by the uROM. However, accessing a compressed uROM may involve at least one extra step (e.g., obtaining an index of a unique pattern) than accessing an uncompressed uROM, as illustrated by FIGS. 1A, 1B and 1C. As a result, it may take longer time to access a compressed uROM. Thus, it is desirable to design a compressed uROM in such a way that accessing it can be as fast as accessing an uncompressed uROM.

Figure 12:
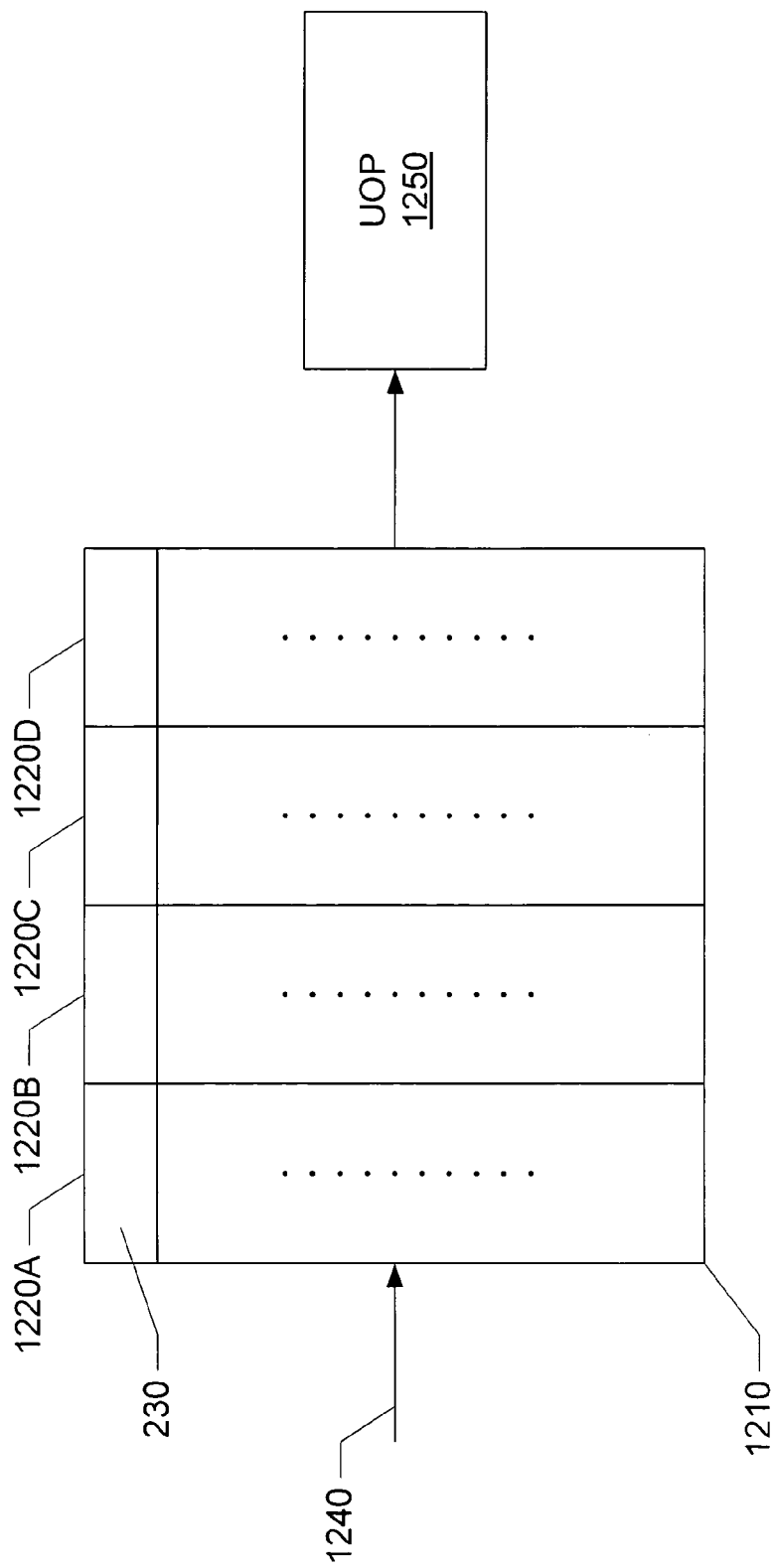
FIG. 12 illustrates how to access an uncompressed uROM.

Accessing FIG. 12 illustrates how to access an uncompressed uROM 1210. The uncompressed uROM may comprise multiple banks (e.g., 1220A, 1220B, 1220C, and 1220D). Each bank has multiple lines (rows) (e.g., 1230) with each line storing one uOP. When an address 1240 of a uOP is received by the uROM 1210, information encoded within the address may help find the desired uOP in a right line of a right bank. The output of the uROM is the desired uOP 1250. An uncompressed uROM may also be accessed by addresses of two uOPs at the same time so that two uOPs are fetched from the uROM at the same time. It may take only one cycle to fetch one or two uOPs from an uncompressed uROM. Depending on the design of a processor, the number of cycles needed to fetch a uOP from an uncompressed uROM may vary from one processor to another.

Figure 13:
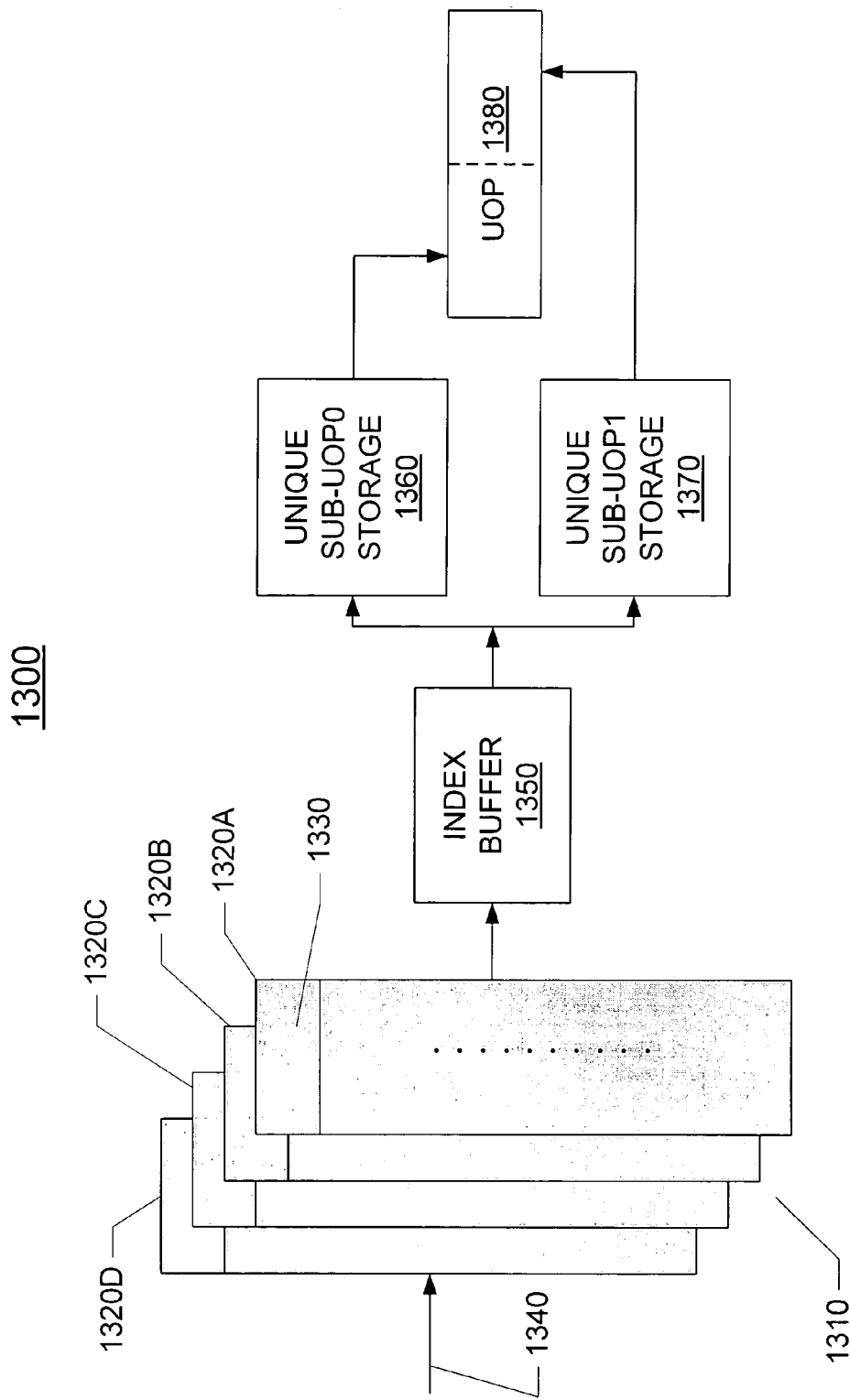
FIG. 13 illustrates an example design of a compressed uROM that may improve the uOP fetching speed.

FIG. 13 illustrates an example design 1300 of a compressed uROM that may improve the uOP fetching speed, according to an embodiment of the disclosed subject matter. The compressed uROM comprises an index storage device 1310, an index buffer 1350, and unique pattern storage device including unique sub-uOP0 storage 1360 and unique sub-uOP1 storage 1370. Index storage device 1310 may comprise multiple banks (e.g., 1320A, 1320B, 1320C, and 1320D). Each bank has multiple lines (e.g., 1330) with each line storing an index pointing to an entry in the unique pattern storage device. The index storage device has the similar structure as an uncompressed uROM, but the former stores indices of unique patterns in uOPs while the latter stores uOPs directly. The index storage device is smaller than a corresponding uncompressed uROM because the size of indices of unique patterns is smaller than original uOPs.

As illustrated in FIG. 13, banks in index storage device 1310 may be accessed in parallel by a uOP address 1340. Banks in the index storage device may be divided into a number of groups with each group storing indices pointing to entries in a unique sub-uOP storage (e.g., 1360). For example, banks 1320A and 1320B may be used to store indices of entries in unique sub-uOP0 storage 1360; and banks 1320C and 1320D may be used to store indices of entries in unique sub-uOP1 storage 1370. A uOP address 1340 may obtain all the indices of unique patterns, which are needed to form the desired uOP 1380, from their corresponding banks in the index storage device simultaneously. Indices fetched from index storage device 1310 may be stored in index buffer 1350. The index buffer may be helpful when the process of fetching uOPs from the compressed uROM is pipelined.

Because an extra step (e.g., fetching indices of unique patterns) is involved, fetching a uOP from a compressed uROM such as the one shown in FIG. 13 may take more cycles than fetching a uOP from an uncompressed uROM. For example, it may take two cycles to fetch a uOP from a compressed uROM while it only takes one cycle to fetch a uOP from an uncompressed uROM. To reduce the average number of cycles needed to fetch a uOP from a compressed uROM, it is desirable to pipeline the fetching processing. When the uOP fetching process is fully pipelined, the average number of cycles needed to fetch a uOP from a compressed uROM is approximately one, which is almost the same as that needed to fetch a uOP from an uncompressed UROM (assuming the number of cycles needed to access a uOP from an uncompressed uROM is one).

Figure 14:
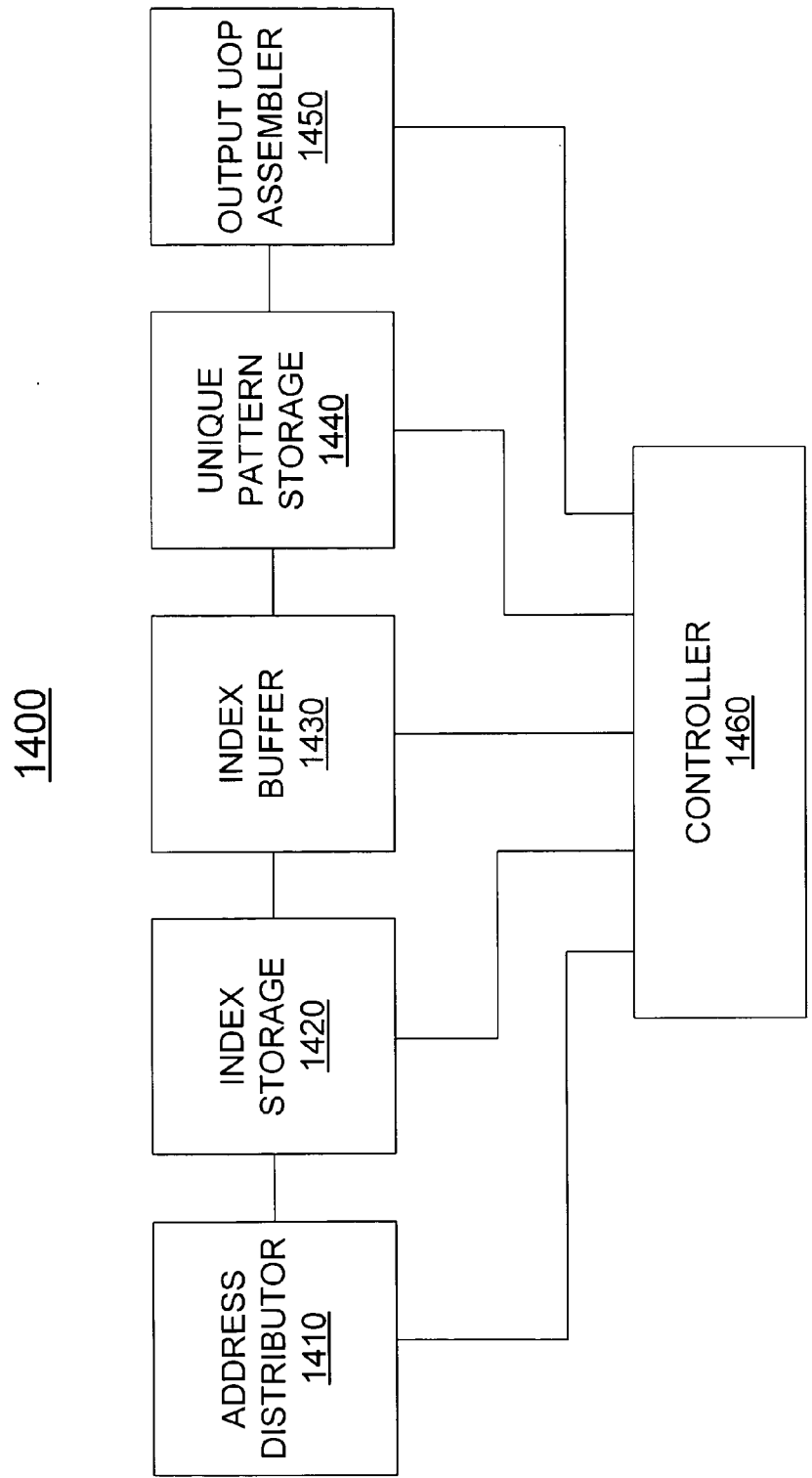
FIG. 14 shows one example block diagram of an apparatus for efficiently accessing a compressed uROM.

FIG. 14 shows one example block diagram of an apparatus 1400 for efficiently accessing a compressed uROM. Apparatus 1400 comprises an address distributor 1410, an index storage 1420, an index buffer 1430, a unique pattern storage 1440, an output uOP assembler 1450, and a controller 1460. Address distributor 1410 provides uOP address/addresses to index storage 1420. The address distributor may enable one or more uOP addresses to access, in parallel, multiple banks or multiple groups of banks in the index storage. Based on information encoded in an input uOP address, the address distributor may also help connect the input uOP address with indices, which point to unique patterns included in the desired uOP, in a right bank of the index storage. In some embodiments, there might not be a specific address distributor and uOP addresses may be provided to the index storage through hard wiring. Index storage 1420 may include one or more banks with each bank storing indices pointing to entries in unique pattern storage 1440. Unique pattern storage 1440 may include one or two sub-storages with each sub-storage storing unique patterns for a sub-uOPs or a cluster of columns of all the uOPs. A sub-storage in the unique pattern storage may have one or more banks in the index storage specifically storing indices of entries in the sub-storage.

Index buffer 1430 may temporarily store pattern indices fetched from index storage 1420 by one or more input uOP addresses. The index buffer may be very useful when indices of unique patterns corresponding to two or more uOP addresses are fetched from the index storage in parallel. Output uOP assembler 1450 may re-organize bits in unique patterns fetched from unique pattern storage 1440 to produce a correct output uOP. For example, when the unique storage stores unique patterns for one or more clusters of columns obtained by using a clustering-based compression approach as described above, the output uOP cannot be simply obtained by concatenating different unique patterns. Bits in each unique pattern may be spread into different non-adjacent positions in the output uOP. In some embodiments, there might not be a specific output uOP assembler. The outputs from unique pattern storage 1440 may be hard-wired properly to produce a correct output uOP, according to the compression scheme used.

Controller 1460 controls operations of all of the other components in apparatus 1400. For example, the controller may direct address distributor 1410 to send an input address to a specific bank in index storage 1420. The controller may coordinate with the index storage to provide parallel access by two or more input uOP addresses. The controller may also instruct output uOP assembler 1450 how to assemble fetched unique patterns to produce a correct uOP. The controller coordinates with the other components in the apparatus to pipeline the uOP fetching process so that at least one uOP may be fetched from a compressed uROM per cycle, after the very first uOP(s) is/are fetched. Assume that it takes one cycle to fetch indices of unique patterns required to form the desired uOP from the index storage, and one cycle to fetch unique patterns from the unique pattern storage and to output the desired uOP. This two-cycle fetching process can be fully-pipelined with the assistance from the controller. For example, after the first uOP address has fetched indices of unique patterns required by the desired uOP, the indices may be temporarily stored in index buffer 1430. When the next cycle starts, these indices are used to fetch the required unique patterns to produce the desired uOP; and in parallel, the controller may let the next uOP address to fetch its indices of unique patterns.

In one embodiment, address distributor 1410 and/or output uOP assembler 1450 may be integrated with controller 1460, or the controller may perform functions of the address distributor and/or the output uOP assembler without a specific address distributor or a specific output uOP assembler. Typically, the index storage, the index buffer, and the unique pattern storage may be integral parts of a compressed uROM. In one embodiment, some or all of the other components such as the address distributor, the output uOP assembler, and the controller may also be integrated with the uROM. Additionally, functions of controller may be performed by the processor in which the uROM is located.

Figure 15:
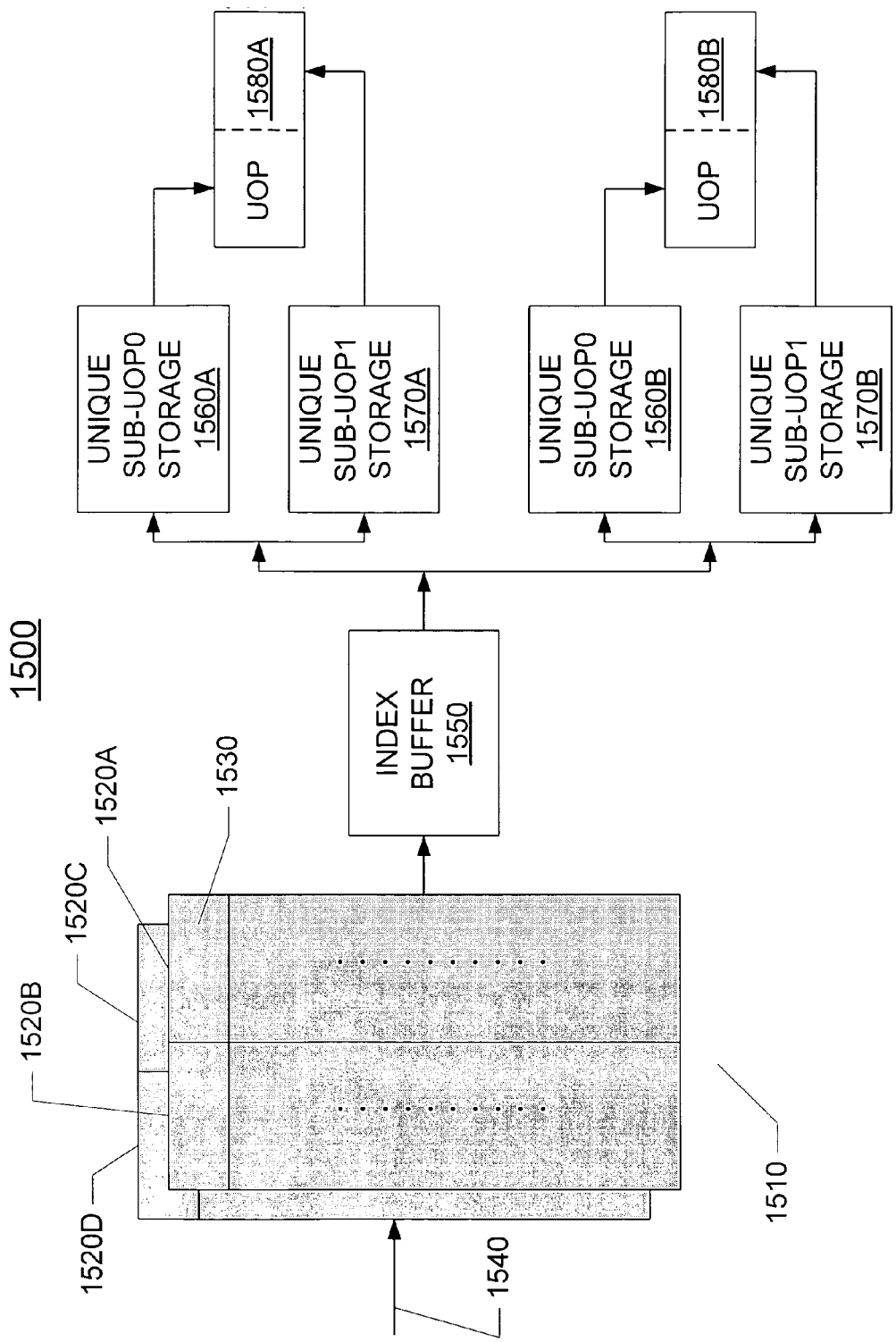
FIG. 15 illustrates an example for fetching multiple microcode words ("uOPs") in a compressed uROM.

FIG. 15 illustrates an example 1500 for accessing multiple uOPs in a compressed uROM, according to an embodiment of the disclosed subject matter. Similar to the example shown in FIG. 13, the uROM in example 1500 also comprises an index storage device 1510, an index buffer 1550, and unique pattern storage device including unique sub-uOP0 storage 1560 and unique sub-uOP1 storage 1570. In example 1500, however, index storage device 1510 can be accessed by two uOP addresses in parallel so that two uOPs may be obtained per access. Banks 1520A and 1520B in index storage device 1510 may be grouped together to provide access for one uOP address; and banks 1520C and 1520D may be grouped together to provide access for another uOP address in parallel. Within each group of banks, one bank may be specifically used to store indices of patterns in one unique sub-uOP0 pattern storage, e.g., bank 1520A and bank 1520C for 1560A and 1560B, respectively; and bank 1520B and 1520D for 1570A and 1570B, respectively. A uOP address may access individual banks in each group within the index storage device in parallel.

Indices fetched from index storage device 1510 may be stored in index buffer 1550, which may also comprise two sections corresponding to two groups of banks in index storage device 1510. Indices fetched from one group of banks correspond to one uOP address and may be stored in one section of the index buffer; indices fetched from the other group of banks correspond to another uOP address and may be stored in the other section of the index buffer. Similar to the example shown in FIG. 13, accessing the compressed uROM in example 1500 may also be fully-pipelined so that two uOPs may be fetched in the uROM every cycle, after the very first two uOPs have been fetched. The index buffer may be used to temporarily store indices fetched from the index storage device for the pipelining purpose.

Figure 16:
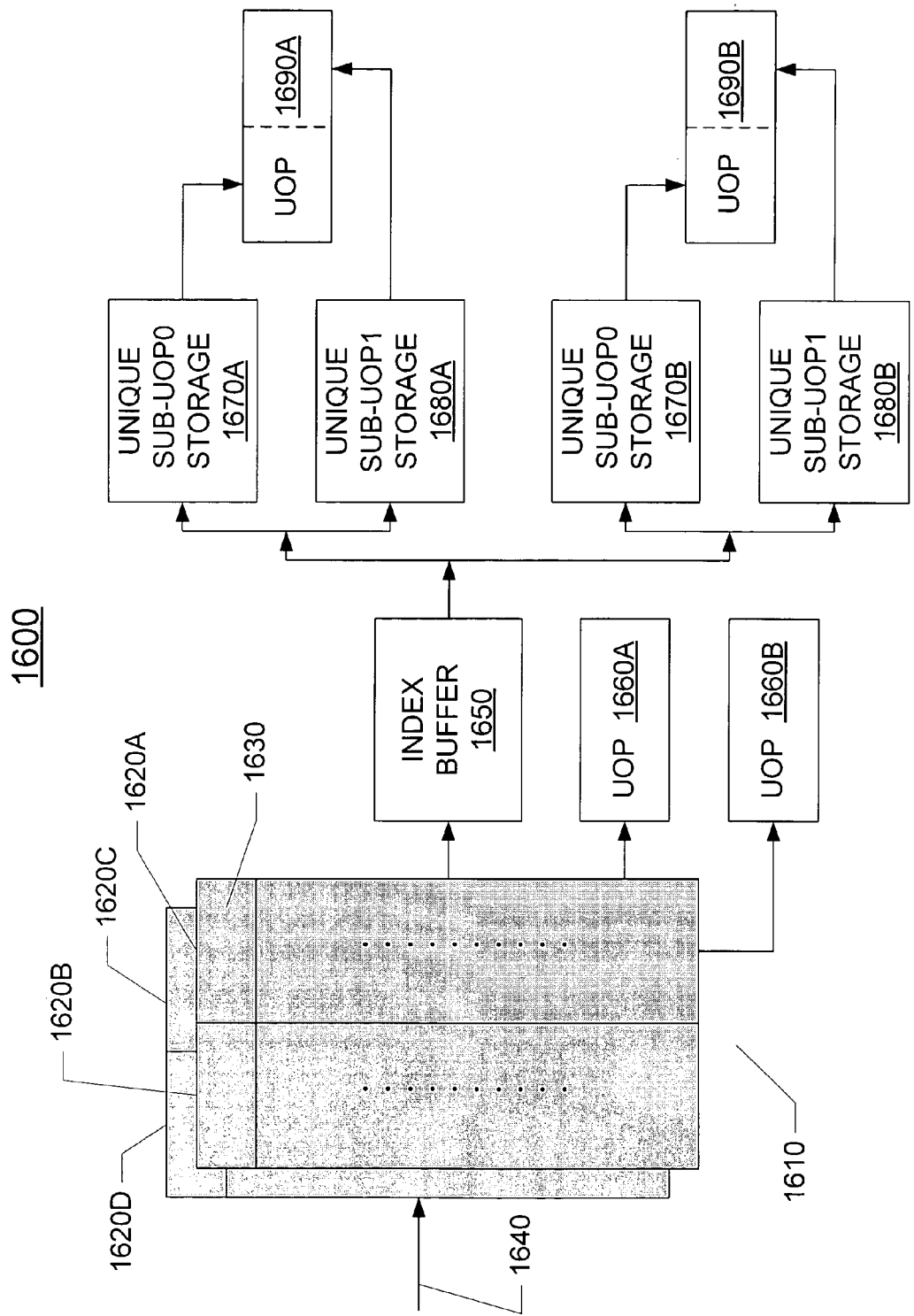
FIG. 16 illustrates an example for fetching multiple uOPs in a partially compressed uROM.

Assume that the latency of fetching a uOP from an uncompressed uROM is one cycle and the latency of fetching a uOP from a compressed uROM is two cycles. Even if the process of fetching a uOP from a compressed uROm is fully pipelined, it still takes two cycles instead of one cycle to fetch the very first uOP (the very first two uOPs if two uOPs can be simultaneously fetched). To overcome this disadvantage, a uROM may be partially compressed. FIG. 16 illustrates an example 1600 for accessing multiple uOPs in a partially compressed uROM. Similar to the example shown in FIG. 15, two uOPs may be fetched from the uROM in parallel. In example 1600, however, banks in storage device 1610 are divided into two groups: an index storage part for storing indices of unique patterns and a uOP storage part for storing original uOPs. For example, banks 1620A and 1620B may be used for storing original uOPs and there is no compression associated with these banks. Bank 1620C and 1620D may be used for storing indices and these two banks function similarly as index storage device 1510 in FIG. 15.

Both the index storage part and the uOP storage part of storage device 1610 can be accessed by two uOP addresses in parallel so that two uOPs may be obtained per access. Within each of the two parts, one or more banks (e.g., 1520C in the index storage part and 1520A in the uOP storage part) ("the first section") may be used to provide access for one uOP address and one or more other banks (e.g., 1520D in the index storage part and 1520B in the uOP storage part) ("the second section") may be used to provide access for another uOP address in parallel. Each section of the index storage part may be further divided into two or more sub-sections, with each sub-section storing indices of patterns for a set of sub-uOPs or a cluster of columns of all the uOPs (e.g., patterns stored in unique sub-uOP0 pattern storage 1670A). A uOP address may access each sub-sections in each section of the index storage part in parallel.

Indices fetched from the index storage part of storage device 1610 may be stored in index buffer 1650, which may also comprise two sections corresponding to two sections in the index storage part. Indices fetched from one section of the index storage part correspond to one uOP address and may be stored in one section of the index buffer; indices fetched from the other section of the index storage part correspond to another uOP address and may be stored in the other section of the index buffer. Similar to the example shown in FIG. 15, accessing the compressed part of the uROM in example 1600 may also be fully-pipelined so that two uOPs may be fetched in the uROM every cycle, after the very first two uOPs have been fetched from the compressed part. The index buffer may be used to temporarily store indices fetched from the index storage device for the pipelining purpose.

When two uOP addresses (1640) are received by storage device 1610, these addresses are provided to both the index and uOP storage parts. Typically, it can be predicted which uOPs will be accessed at the very beginning of uROM access once a processor is designed. Thus, those uOPs may be stored in the uOP storage part (uncompressed part) so that only one cycle is needed to fetch two of such uOPs (assuming the uOP fetching latency from the uncompressed part is one cycle). The uROM in example 1600 is only partially compressed and thus its die size might not be reduced to the same extent as the die size of the uROM shown in FIG. 15.

Although examples shown in FIGS. 15 and 16 illustrate that two uOPs may be fetched from the uROM in parallel, the design can be extended to situations where more than two uOPs may be fetched from the uROM in parallel, using the same principle disclosed herein. In examples shown in FIGS. 13, 15, and 16, unique pattern storages are shown to include unique sub-uOP pattern storages. However, this does not imply that the scheme used to compress the uROM is limited to divide uOPs into sub-uOPs and then find unique patterns for each set of sub-uOPs. Other compression schemes such as the clustering-based compression approaches disclosed above may also be applied. When a clustering-based compression approach is used, spreaders as shown in FIG. 3 may be needed to ensure the correct output of uOP(s).

Figure 17:
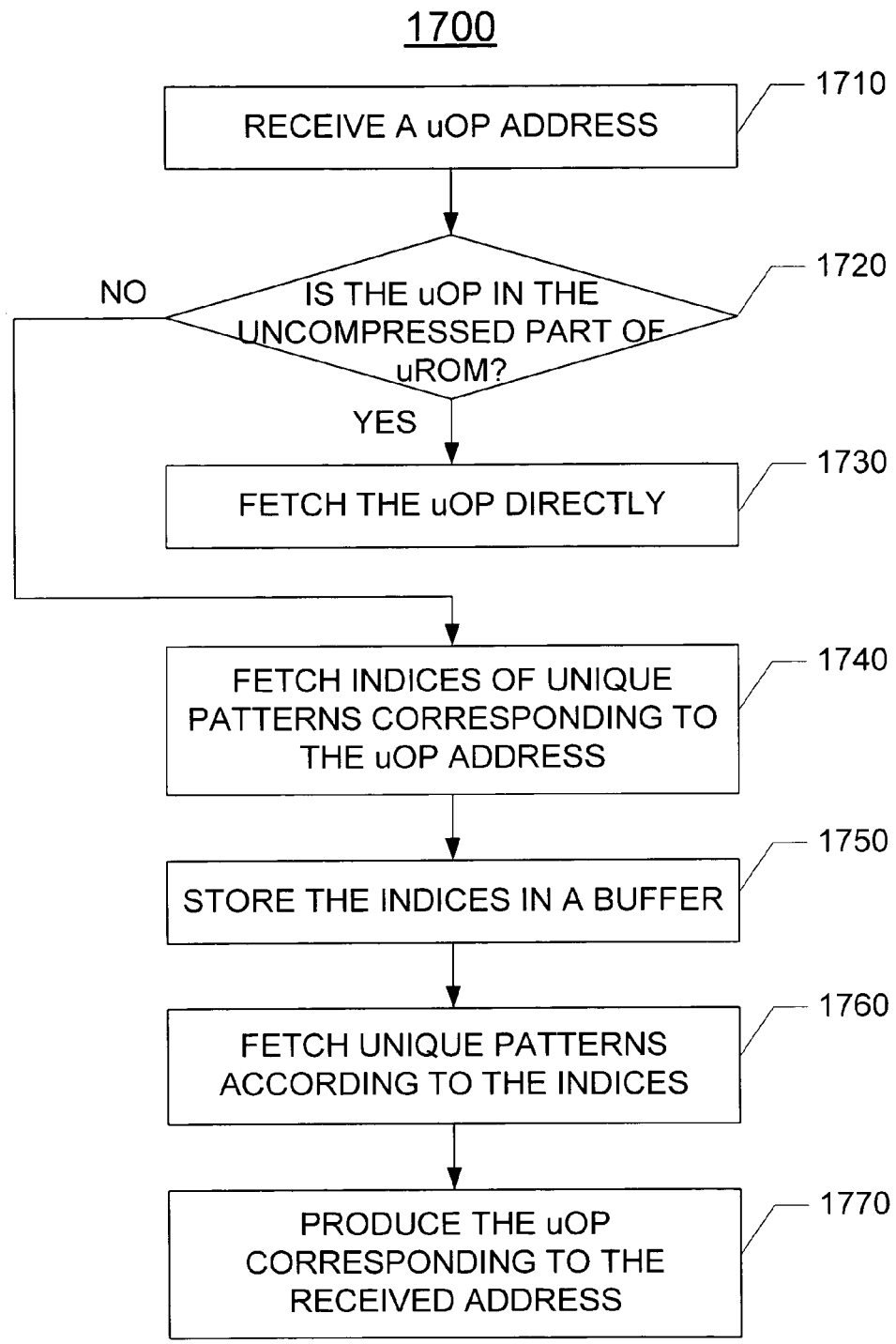
FIG. 17 shows a flowchart of one example process for efficiently accessing a uROM that is at least partially compressed.

FIG. 17 shows a flowchart of one example process 1700 for efficiently accessing a uROM that is at least partially compressed. At block 1710, a uOP address may be received. If the uROM can be accessed by two or more addresses in parallel, two or more uOP addresses may be received at block 1710. At block 1720, a decision whether the desired uOP(s) is/are in the uncompressed part of the uROM may be made. If the uROM is totally uncompressed or totally compressed, the decision at this block may be eliminated. If the uROM is partly compressed and a desired uOP is stored in the uncompressed part, this uOP may be directed fetched from the storage in the uncompressed part at block 1730.

If a desired uOP is stored in the compressed part of the uROM, indices of unique patterns that form the desired uOP may be fetched at block 1740. These indices may be fetched in parallel. At block 1750, the fetched indices of the unique patterns for the desired uOP may be temporarily stored in a buffer. At block 1760, the unique patterns required for the desired uOP may be fetched. At block 1770, the desired uOP may be produced from the fetched unique patterns. Depending on the type of compression schemes (e.g., clustering-based compression approach) used, bits in the fetched unique patterns may need to be re-arranged to produce the desired uOP.

The process of fetching uOP(s) in a compressed uROM or in the compressed part of a uROM may be pipelined. One example scheme of pipelining the fetching process may be as follows. Assume that it takes one cycle to fetch indices of unique patterns and one cycle to fetch unique patterns. During the first cycle, indices of unique patterns required for the first uOP are fetched and stored in a buffer according to the address of the first uOP. At the end of the first cycle, the address of the second uOP may be received. When the second cycle begins, the unique patterns for the first uOP may start to be fetched and indices of unique patterns required for the second uOP may start to be fetched. At the end of the second cycle, the first uOP may be produced, and the indices of unique patterns required for the second uOP may be stored in the buffer; and the address of the third uOP may be received. After the second cycle, one uOP may be fetched per cycle. If the uROM can be accessed by two or more addresses in parallel, after the second cycle, two or more uOPs may be fetched per cycle.

Figure 18:
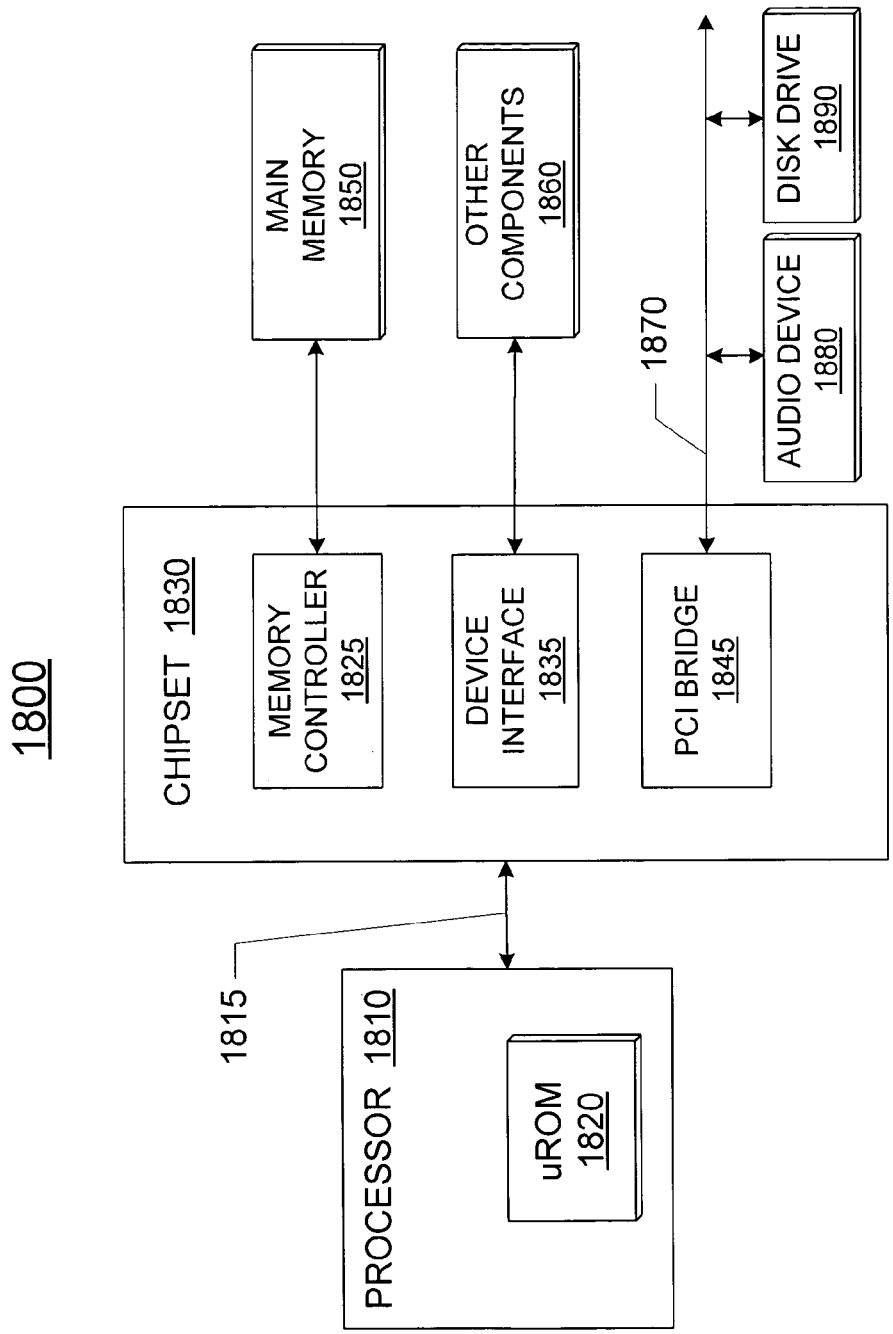
FIG. 18 shows a general computing system with a process that has a compressed uROM.

FIG. 18 shows a general computing system 1800 with a process that has a compressed uROM. Note that the details shown in the figure are not required and systems with different details may be used. The computing system comprises one or more processors 1810 coupled to a system interconnect 1815. Processor 1810 may be a single-core or multi-core processor. Additionally, the processor includes a uROM 1820 to store microcode. The uROM may be compressed using a compression scheme such as a clustering-based compression scheme as disclosed above. The uROM may comprise an index storage device to accept an input address of an uOP and to store indices of unique patterns. The uROM may also comprise a unique pattern storage device to store unique patterns in a cluster of columns of all the uOPs or in a set of sub-uOPs. The process of fetching uOPs from the uROM may be fully pipelined.

The computing system 1800 may also include a chipset 1830 coupled to the system interconnect 1815. Chipset 1830 may include one or more integrated circuit packages or chips. Chipset 1830 may comprise one or more device interfaces 1835 to support data transfers to and/or from other components 1860 of the computing system 1800 such as, for example, BIOS firmware, keyboards, mice, storage devices, network interfaces, etc. Chipset 1830 may be coupled to a Peripheral Component Interconnect (PCI) bus 1870. Chipset 1830 may include a PCI bridge 1845 that provides an interface to the PCI bus 1870. The PCI Bridge 1845 may provide a data path between the processor 1810 as well as other components 1860, and peripheral devices such as, for example, an audio device 1880 and a disk drive 1890. Although not shown, other devices may also be coupled to the PCI bus 1870.

Additionally, chipset 1830 may comprise a memory controller 1825 that is coupled to a main memory 1850. The main memory 1850 may store data and sequences of instructions that are executed by the processor 1810 or any other device included in the system. The memory controller 1825 may access the main memory 1850 in response to memory transactions associated with the processor 1810, and other devices in the computing system 1800. In one embodiment, memory controller 1850 may be located in processor 1810 or some other circuitries. The main memory 1850 may comprise various memory devices that provide addressable storage locations which the memory controller 1825 may read data from and/or write data to. The main memory 1850 may comprise one or more different types of memory devices such as Dynamic Random Access Memory (DRAM) devices, Synchronous DRAM (SDRAM) devices, Double Data Rate (DDR) SDRAM devices, or other memory devices.

Although an example embodiment of the disclosed subject matter is described with reference to block and flow diagrams in FIGS. 1-18, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A computer-implemented method to access a microcode read only memory ("uROM") that is at least partly compressed, the method comprising:
   receiving an address of a microcode word ("uOP") to be fetched from said uROM;
   fetching said uOP from a compressed portion of said uROM with the address, the compressed portion of said uROM including
   a pattern storage having unique patterns identified in groups of columns of a table of microcode words ("uOPs") where similar columns, selected from among any columns of the table, have been selectively clustered together, and wherein column 1 is in one group and column 2 is in another group, and
   an index storage having indices of said unique patterns stored in said pattern storage.

2. The method of claim 1, further comprising:
   temporarily storing, at an index buffer, indices retrieved from said index storage by said address of said uOP to be fetched.

3. The method of claim 2, wherein fetching said uOP from said compressed portion of said uROM comprises:
   fetching indices of said unique patterns to produce said uOP from said index storage based at least in part on said received address;
   fetching said unique patterns from said pattern storage according to said fetched indices; and
   producing said uOP based at least in part on said fetched unique patterns.

4. The method of claim 3, further comprising:
   temporarily storing said fetched indices of said unique patterns in said index buffer before fetching said unique patterns from said pattern storage.

5. The method of claim 3, wherein said indices of said unique patterns to produce said uOP are fetched from said index storage in parallel.

6. The method of claim 3, wherein said unique patterns are fetched from said pattern storage in parallel.

7. The method of claim 1, wherein said uROM is capable of being accessed by multiple uOP addresses in parallel.

8. A computer system comprising:
   a dynamic random access memory (DRAM);
   a processor having a processor core having a microcode read only memory ("uROM") to store microcode; and
   a control mechanism coupled with said processor core, the control mechanism to receive an address of a microcode word ("uOP") to be fetched from said uROM;
   fetch said uOP from a compressed portion of said uROM with the address, the compressed portion of said uROM including
   a pattern storage having unique patterns identified in groups of columns of a table of microcode words ("uOPs") where columns are selectively clustered together, wherein two columns in a first group are separated from one another by a column in a second group, and
   an index storage having indices of said unique patterns stored in said pattern storage.

9. The computer system of claim 8, wherein said compressed portion of said uROM further comprises:
   an index buffer to temporarily store indices of said unique patterns to be retrieved from said index storage by said address of said uOP to be fetched.

10. The computer system of claim 9, wherein said indices of said unique patterns to produce said uOP are to be fetched from said index storage in parallel.

11. The computer system of claim 9, wherein said unique patterns are to be fetched from said pattern storage in parallel.

12. The computer system of claim 8, wherein said uROM is capable of being accessed by multiple uOP addresses in parallel.

13. A processor comprising:
    a processor core having a microcode read only memory ("uROM") to store microcode; and
    a control mechanism coupled with said processor core, the control mechanism to receive an address of a microcode word ("uOP") to be fetched from said uROM;
    fetch said uOP from a compressed portion of said uROM with the address, the compressed portion of said uROM including
    a pattern storage having unique patterns identified in groups of columns of a table of microcode words ("uOPs") where columns are selectively clustered together not merely according to column order, and
    an index storage having indices of said unique patterns stored in said pattern storage.

14. The processor of claim 13, wherein said compressed portion of said uROM further comprises:
    an index buffer to temporarily store indices of said unique patterns to be retrieved from said index storage by said address of said uOP to be fetched.

15. The processor of claim 14, wherein said indices of said unique patterns to produce said uOP are to be fetched from said index storage in parallel.

16. The processor of claim 14, wherein said unique patterns are to be fetched from said pattern storage in parallel.

17. The processor of claim 13, wherein said uROM is capable of being accessed by multiple uOP addresses in parallel.

18. The processor of claim 13, wherein columns clustered together may be selected from among any columns of the table.

19. The processor of claim 13, wherein two columns in a first group are separated from one another by a column in a second group.

20. The processor of claim 13, wherein column 1 of the table is in one group and column 2 of the table is in another group.

21. The processor of claim 13, wherein the uROM further comprises an uncompressed portion.

22. The processor of claim 13, further comprising a spreader, the spreader to change a bit order of a unique pattern to correspond to that of an associated uOP.

23. A machine-readable storage medium comprising instructions stored thereon to access a microcode read only memory ("uROM") that is at least partly compressed, wherein the instructions, when executed, cause a machine to:
    receive an address of a microcode word ("uOP") to be fetched from said uROM;
    fetch said uOP from a compressed portion of said uROM with the address, the compressed portion of said uROM including
    a pattern storage having unique patterns identified in groups of columns of a table of microcode words ("uOPs") where similar columns have been selectively clustered together rather than being merely partitioned into groups according to column order, and
    an index storage having indices of said unique patterns stored in said pattern storage.

24. The machine-readable storage medium of claim 23, wherein the instructions, when executed, further cause the machine to:

temporarily store, at an index buffer, indices retrieved from said index storage by said address of said uOP to be fetched.

25. The machine-readable storage medium of claim 24, wherein the instructions when executed to fetch said uOP from said compressed portion of said uROM, further cause the machine to:

fetch indices of said unique patterns to produce said uOP from said index storage based at least in part on said received address;

fetch said unique patterns from said pattern storage according to said fetched indices; and produce said uOP based at least in part on said fetched unique patterns.

26. The machine-readable storage medium of claim 25, wherein the instructions, when executed, further cause the machine to:

temporarily store said fetched indices of said unique patterns in said index buffer before fetching said unique patterns from said pattern storage.

27. The machine-readable storage medium of claim 25, wherein said indices of said unique patterns to produce said uOP are fetched from said index storage in parallel.

28. The machine-readable storage medium of claim 25, wherein said unique patterns are fetched from said pattern storage in parallel.

29. The machine-readable storage medium of claim 23, wherein said uROM is capable of being accessed by multiple uOP addresses in parallel.

30. The machine-readable storage medium of claim 23, wherein said medium comprises a medium selected from a memory and a storage device.

31. A processor comprising:

a compressed microcode read only memory (uROM), the compressed uROM including:

a pattern storage having unique patterns corresponding to clusters of columns of a table of microcode words ("uOPs"), where the clusters of the columns are clustered not merely according to column order;

an index storage having indices of said unique patterns; and a spreader to change a bit order of a unique pattern to correspond to a bit order of a corresponding uOP.

* * * * *